…

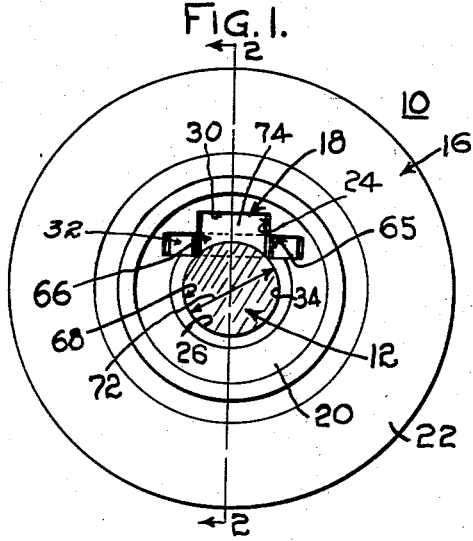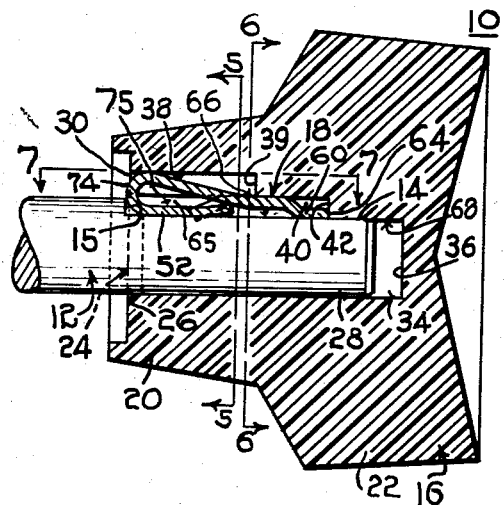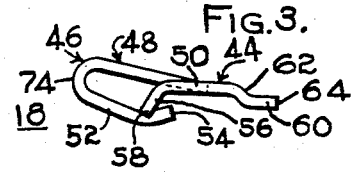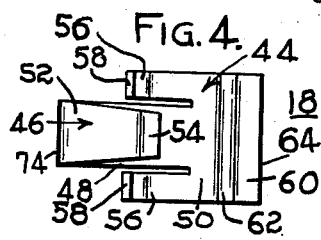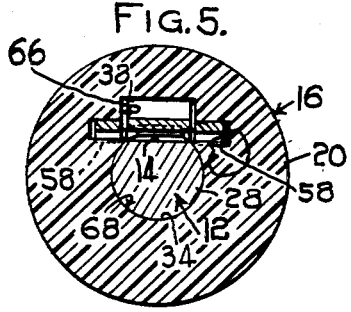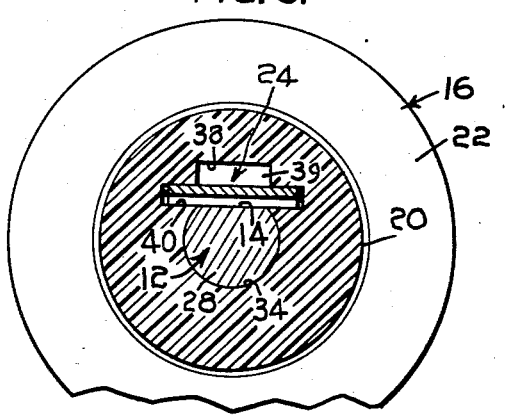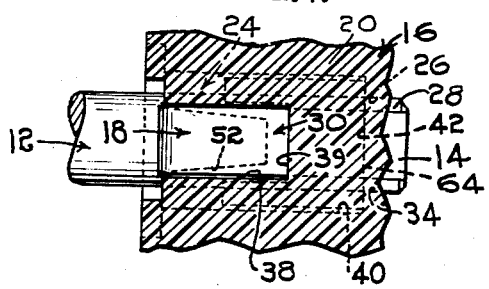
INVENTOR:
RICHARD H. BENGTSON JR,
BY Walter P. Jones
ATTORNEY.

United States Patent Office 2,940,782
Patented June 14, 1960

2,940,782

KNOB FASTENER

Richard H. Bengtson, Jr., Arlington, Mass., assignor to United-Carr Fastener Corporation, Cambridge, Mass., a corporation of Delaware Filed Aug. 15, 1958, Ser. No. 755,215

1 Claim. (Cl. 287—53)

This invention relates to improvements in knob fastening devices which may be of the type used on radio dial panels or automobile instrument panels as finger operative means for actuating switches and the like and is directed particularly to an improved fastener and assembly, the fastener being adapted to be quickly assembled with a knob and operable to enable a shaft to be secured to the knob.

A further object of the invention is to provide a fastening device for a knob assembly or the like which is adapted to be assembled in the interior of a knob for frictional engagement with a shaft to be assembled with the knob to prevent vibration of the knob on the shaft and to resist axial forces from separating the knob and the shaft.

Other objects of the invention will, in part, be obvious, and will, in part, appear hereinafter.

In the drawing:

Fig. 1 is a front elevation of the improved fastener, partly in section;

Fig. 2 is a section taken on line 2—2 of Fig. 1;

Fig. 3 is a side elevation of the fastener;

Fig. 4 is an underneath plan of the fastener shown in Fig. 3;

Fig. 5 is a section taken on line 5—5 of Fig. 2;

Fig. 6 is a section taken on line 6—6 of Fig. 2; and

Fig. 7 is a section taken on line 7—7 of Fig. 2.

Referring to the drawing, there is illustrated a knob assembly 10, adapted for assembly onto the end of a control shaft 12, said shaft 12 having a flat side portion 14 to cooperate with the knob member 16, of the knob assembly 10 in a manner to prevent relative rotation of the parts as will be hereinafter more fully set forth. The knob assembly 10 comprises the knob member 16, and a fastening device 18.

The knob member 16 is preferably formed of a zinc, although it may be formed of steel, glass, plastic or the like and comprises a tapered cylindrical neck portion 20 and an integral irregularly shaped body portion 22 which, in effect, caps one end of the neck portion 20. The opposite end of the neck 20 from that to which the body 22 is attached has an irregular opening or aperture 24. The aperture 24 in my preferred form has a cross sectional shape substantially as illustrated in Fig. 5 and comprises a shaft receiving opening 26 adapted to admit the end 28 of the control shaft 12 and formed into a geometric shape to closely circumscribe the control shaft 12, a second opening 30 adjacent one side of the shaft receiving opening 26 for receiving attaching means of the fastening device 18. Thus, the openings 26 and 30 are substantially key hole shaped in cross section with the opening 26 in the form of a segment of a circle and the second opening 30 rectangular in form. Of course, both the openings 26 and 30 can assume any necessary geometric form depending on size and shape of the fastening device 18 or the control shaft 12 and a pair of relatively narrow openings 32 intersect the opening 30 and extend laterally outwardly from opposed sides thereof. The relationship of the three openings is best illustrated by Fig. 1 of the drawing. The openings 32 extend inwardly to form two channels 75. The opening 26 extends as a shaft channel 34 a predetermined distance into the body portion 22 through the neck portion 20 ending in a shaft terminus 36. The opening 30 extends into the knob member 16 a predetermined distance forming a passage 38 which terminates at the abutment 39 and then decreases in height to join channels 75 and become a part of the fastener channel 40 which extends into the body portion 22. The fastener channel 40 terminates at the end farthest from the opening 30 in a fastener stop 42 and is open for its full length into the shaft channel 34. The relationship of the passage 38 and the two channels 34 and 40 is best shown in Fig. 2.

The fastening device 18 is formed of a single piece of resilient sheet metal comprising an angular base portion 44 and a tripartite frictional engaging portion 46 having a relatively long center segment 48 bent back upon itself to form a U-shaped hook portion embodying a spring-like shaft engaging element 52 whose terminal end 54 is flared toward the said center segment 48 and two relatively shorter spacing elements 56 located on each side of said center segment 48 on the same plane and in substantially spaced parallel relationship with it whose terminal ends 58 are flared toward the said shaft engaging element 52. The segment 48 and the spacing elements 56 are all integral with an effectually flat connecting portion 50. The angular base portion 44 comprises a flat complementary bearing element 60 in substantially spaced parallel relationship to said connecting portion 50 and in integral angular relationship to both the connecting portion 50 and the bearing element 60, a combining portion 62.

To assemble the knob member 16, the control shaft 12 and the fastening device 18, the forward edge 64 of the complementary bearing element 60 is passed between the walls 65 of the shafts 75, then between the walls 66 of the fastener channel 40 and the passage 38 until it bears against the fastener stop 42. The fastener 18 is placed in the channel 40 so that the shaft engaging element 52 lies partly in the shaft channel 34. The control shaft 12 is passed through the shaft receiving opening 26 between the walls 68 of the shaft channel 34 until the shaft shoulder 15 bears against the bight 74 of the fastening device 18. The flat side portion 14 of the shaft 12 is faced to bear against the shaft engaging element 52. The diameter of the shaft 12 is constructed equal to the diameter of the shaft channel 34. Therefore, the shaft engaging element 52 is moved in a lateral direction between the spacing elements 56 so that the terminal ends 58 of the spacing elements 56 will make biting engagement with the bottoms of the channels 75 as best illustrated in Fig. 5.

Since certain other obvious modifications may be made in this device without departing from the scope of the invention, it is intended that all matter contained herein be interpreted in an illustrative and not in a limiting sense.

I claim:

A knob fastener of the class described comprising a single piece device having a base portion, an offset portion at one end of said base portion, a yieldable shaft engaging portion bent back on itself and extending from said base portion at an edge thereof opposite the end where said offset base portion is located, two yieldable spacing elements, one on each side of the shaft engaging portion, also extending from the same edge of said base portion as said shaft engaging portion and being spaced laterally from said shaft engaging portion for independent action, and each of said yieldable spacing elements having knob engaging biting portions extending therefrom for biting engagement with a knob to assist in firmly holding said fastener in assembled engagement with the knob.

References Cited in the file of this patent

UNITED STATES PATENTS

| | | |
|---|---|---|
| 2,153,919 | Forsythe | Apr. 11, 1939 |
| 2,154,537 | Stenberg | Apr. 18, 1939 |
| 2,795,034 | Forgette | June 11, 1957 |

FOREIGN PATENTS

| | | |
|---|---|---|
| 735,482 | Germany | May 15, 1943 |